US009152595B2

(12) United States Patent
Ganasan et al.

(10) Patent No.: US 9,152,595 B2
(45) Date of Patent: Oct. 6, 2015

(54) PROCESSOR-BASED SYSTEM HYBRID RING BUS INTERCONNECTS, AND RELATED DEVICES, PROCESSOR-BASED SYSTEMS, AND METHODS

(71) Applicant: QUALCOMM Incorporated, San Diego, CA (US)

(72) Inventors: Jaya Prakash Subramaniam Ganasan, Youngsville, NC (US); Mark Michael Schaffer, Raleigh, NC (US); Prudhvi N. Nooney, Raleigh, NC (US); Perry Willmann Remaklus, Jr., Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 13/654,653

(22) Filed: Oct. 18, 2012

(65) Prior Publication Data
US 2014/0115221 A1 Apr. 24, 2014

(51) Int. Cl.
*G06F 1/32* (2006.01)
*G06F 13/40* (2006.01)
(Continued)

(52) U.S. Cl.
CPC .......... *G06F 13/4027* (2013.01); *G06F 1/3287* (2013.01); *G06F 13/4004* (2013.01); *G06F 15/17375* (2013.01); *G06F 13/368* (2013.01); Y02B 60/1228 (2013.01)

(58) Field of Classification Search
CPC ......... G06F 13/14; G06F 13/36; G06F 13/40; G06F 13/4004; G06F 13/4022; G06F 13/4027; G06F 15/173; G06F 15/17312; G06F 1/3287; G06F 13/368; G06F 13/42; G06F 15/163; G06F 15/17343; G06F 15/17356; G06F 15/17375; Y02B 60/1228
USPC ......... 710/300, 105–106, 305–307, 311–312, 710/316; 709/251
See application file for complete search history.

(56) References Cited

U.S. PATENT DOCUMENTS 4,821,174 A * 4/1989 Webb et al. .................... 710/107
4,965,790 A * 10/1990 Nishino et al. ................ 370/437
(Continued)

OTHER PUBLICATIONS

Ravindran, Govindan, et al. A Performance Comparison of Hierarchical Ring- and Mesh-connected Multiprocessor Networks. Proc. Intl. Symp. on High Performance computer Architecture. Feb. 1997.*

(Continued)

*Primary Examiner* — Thomas J Cleary
(74) *Attorney, Agent, or Firm* — Peter Michael Kamarchik; Nicholas J. Pauley; Paul Holdaway

(57) ABSTRACT

Processor-based system hybrid ring bus interconnects, and related devices, systems, and methods are disclosed. In one embodiment, a processor-based system hybrid ring bus interconnect is provided. The processor-based system hybrid ring bus interconnect includes multiple ring buses, each having a bus width and configured to receive bus transaction messages from a requester device(s). The processor-based system hybrid ring bus interconnect also includes an inter-ring router(s) coupled to the ring buses. The inter-ring router(s) is configured to dynamically direct bus transaction messages among the ring buses based on bandwidth requirements of the requester device(s). Thus, less power is consumed than by a crossbar interconnect due to simpler switching configurations. Further, the inter-ring router(s) allows for provision of multiple ring buses that can be dynamically activated and deactivated based on bandwidth requirements. This provides conservation of power when full bandwidth requirements on the processor-based system hybrid ring bus interconnect are not required.

39 Claims, 13 Drawing Sheets

(51) Int. Cl.
*G06F 15/173* (2006.01)
*G06F 13/368* (2006.01)

(56) References Cited

U.S. PATENT DOCUMENTS

| | | | |
|---|---|---|---|
| 5,349,583 A * | 9/1994 | Christensen et al. | 370/434 |
| 6,658,509 B1 * | 12/2003 | Bonella et al. | 710/100 |
| 7,359,323 B2 | 4/2008 | Magill et al. | |
| 7,808,931 B2 | 10/2010 | Zelig et al. | |
| 7,843,856 B2 | 11/2010 | Ramakrishnan et al. | |
| 7,916,636 B2 | 3/2011 | Prashker et al. | |
| 2002/0064166 A1 * | 5/2002 | Suetsugu et al. | 370/403 |
| 2003/0088754 A1 * | 5/2003 | Barry et al. | 712/11 |
| 2004/0215983 A1 * | 10/2004 | Kwahk et al. | 713/300 |
| 2005/0152382 A1 * | 7/2005 | Stirling et al. | 370/403 |
| 2006/0218449 A1 * | 9/2006 | Blasco Allue et al. | 714/45 |
| 2007/0005804 A1 * | 1/2007 | Rideout | 709/246 |
| 2007/0067548 A1 | 3/2007 | Juenger | |
| 2007/0094437 A1 * | 4/2007 | Jabori et al. | 710/307 |
| 2007/0186027 A1 | 8/2007 | Klema et al. | |
| 2008/0140891 A1 | 6/2008 | Fong et al. | |
| 2009/0016358 A1 | 1/2009 | Lee | |
| 2009/0150689 A1 * | 6/2009 | Simeral et al. | 713/300 |
| 2012/0195321 A1 * | 8/2012 | Ramanujam et al. | 370/405 |
| 2013/0159750 A1 * | 6/2013 | Branover et al. | 713/323 |
| 2013/0173933 A1 * | 7/2013 | Ramani et al. | 713/300 |

OTHER PUBLICATIONS

Kinsy, Michel, et al. "Application-Aware Deadlock-Free Oblivious Routing". ACM. 2009.*

Lu, Yen-Wen. "Efficient Multiporcessor Communications: Networks, Algorithms, Simulation, and Implementation". Technical Report No. CSL-TR-96-699. Computer Systems Laboratory, Department of Electrical Engineering, Stanford University. Jul. 1996.*

International Search Report and Written Opinion—PCT/US2013/064075—ISA/EPO—Dec. 9, 2013.

"Jerger N. E., et al., "On-Chip Networks", Synthesis Lectures on Computer Architecture, Morgan and Claypool publishers, 2009, 141 pages.".

* cited by examiner

INTER-RING ROUTER ROUTING TABLE 68(1)

| SOURCE IDENTIFIER (74) | DESTINATION IDENTIFIER (72) | DIRECTION (70) | BUS FREQUENCY RATE (76) | BUS WIDTH BITS (78) |
|---|---|---|---|---|
| 0 | 1 | 1 | DDR | 64 |
| 0 | 2 | 1 | DDR | 64 |
| 0 | 3 | 2 | DDR | 64 |
| 1 | 0 | 2 | DDR | 64 |
| 1 | 2 | 1 | DDR | 64 |
| 1 | 3 | 2 | DDR | 64 |
| 2 | 0 | 2 | DDR | 64 |
| 2 | 1 | 1 | DDR | 64 |
| 2 | 3 | 2 | DDR | 64 |
| 3 | 0 | 2 | DDR | 64 |
| 3 | 1 | 1 | DDR | 64 |
| 3 | 2 | 2 | DDR | 64 |

Directions

INTER-RING ROUTER ROUTING TABLE 68(2)

| SOURCE IDENTIFIER (74) | DESTINATION IDENTIFIER (72) | DIRECTION (70) | BUS FREQUENCY RATE (76) | BUS WIDTH BITS (78) |
|---|---|---|---|---|
| 0 | 1 | 2 | SDR | 32 |
| 0 | 2 | 2 | SDR | 32 |
| 0 | 3 | 2 | SDR | 32 |
| 1 | 0 | 2 | SDR | 32 |
| 1 | 2 | 2 | SDR | 32 |
| 1 | 3 | 2 | SDR | 32 |
| 2 | 0 | 2 | SDR | 32 |
| 2 | 1 | 2 | SDR | 32 |
| 2 | 3 | 2 | SDR | 32 |
| 3 | 0 | 2 | SDR | 32 |
| 3 | 1 | 2 | SDR | 32 |
| 3 | 2 | 2 | SDR | 32 |

Directions

PROCESSOR-BASED SYSTEM HYBRID RING BUS INTERCONNECTS, AND RELATED DEVICES, PROCESSOR-BASED SYSTEMS, AND METHODS

BACKGROUND

I. Field of the Disclosure

The technology of the disclosure relates generally to bus interconnects for communicatively interfacing diverse electronic systems in processor-based systems.

II. Background

Portable electronic devices, such as mobile phones, personal digital assistants (PDAs), and the like, may be manufactured using application specific integrated circuit (ASIC) designs. Developments in achieving high levels of silicon integration have allowed for creation of complex ASICs and field programmable gate array (FPGA) designs. These ASICs and FPGAs may be provided in a single chip to provide a system-on-a-chip (SOC). An SOC provides multiple functioning subsystems on a single semiconductor chip, such as for example, processors, multipliers, caches, and/or other electronic components. SOCs are particularly useful in portable electronic devices because of their integration of multiple subsystems that can provide multiple features and applications within a single chip. Further, SOCs may provide smaller portable electronic devices with use of a single chip, which may otherwise have been provided using multiple chips.

To communicatively interface multiple diverse components or subsystems within a circuit provided on a chip(s), an interconnect communications bus, also referred to as a bus interconnect, can be provided. The bus interconnect is provided using circuitry, including clocked circuitry, which may include as examples registers, queues, and/or other circuits to manage communications among the various subsystems. The bus interconnect facilitates point-to-point connections between initiators of communications requests and targets of the communications requests. The circuitry in the bus interconnect may be clocked with one or more clock signals generated from a master clock signal that operates at a desired bus clock frequency(ies) to provide a desired throughput.

For applications in which reduced power consumption is desirable, the bus clock frequency may be lowered according to the well-known equation of power consumption being equal to $fCV^2$, where 'f' is frequency, 'C' is capacitance, and 'V' is voltage. However, lowering the bus clock frequency also lowers performance of the bus interconnect. Conversely, lowering the bus clock frequency may increase bus latency beyond latency requirements or conditions for the subsystems coupled to the bus interconnect, in which case the performance of the subsystem may degrade or fail entirely. Rather than incur performance degradation or failure of the subsystem, the bus clock frequency may be set to a higher frequency to reduce latency and provide performance margin. However, providing a higher bus clock frequency for the bus interconnect consumes more power.

In this regard, ring bus architectures may be provided in bus interconnects to enable high speed point-to-point communications with lower power consumption at high bus clock frequencies. FIG. 1 illustrates an exemplary ring bus 10 that may be used to provide a bus interconnect. The ring bus 10 may allow for higher bus clock frequencies due to its use of simpler switches located within ring bus nodes 12(0)-12(15), as compared to a crossbar interconnect. For example, the ring bus nodes 12 illustrated in FIG. 1 may be comprised of a multiplexer (MUX) and a latch (e.g., a D flip-flop). A ring bus architecture implemented in a bus interconnect may also be scalable for chip multi-processor (CMP)-based designs.

With continuing reference to FIG. 1, entry points for communications into the ring bus 10 are provided by transmit ring interface units (Tx RIUs) 14(0)-14(2). Exit points for communications out of the ring bus 10 are provided by receive ring interface units (Rx RIUs) 16(0)-16(1). Bus transaction messages 18 (e.g., 18(0)-18(15)) are advanced around the ring bus 10 on each cycle of a clock 20. In FIG. 1, sixteen ring bus nodes 12 are provided. As a result, up to sixteen bus transaction messages 18 can be communicated on the ring bus 10 at any given time. However, as the number of ring bus nodes 12 increase, latency of point-to-point communications may also increase. To reduce latency in this example, three ring bus nodes 12 have Tx RIUs 14(0)-14(2) attached and two ring bus nodes 12 have two Rx RIUs 16(0)-16(1) attached to provide multiple entry and exit points in the ring bus 10. Even so, a data bus size of the ring bus 10 limits a maximum bandwidth in each communication stage between the ring bus nodes 12. Multiple parallel ring buses 10, each having wide data buses, may be employed to achieve desired bandwidth requirements for higher speed point-to-point connections. However, this leads to higher-power consumption compared to shared buses or crossbar interconnect architectures.

SUMMARY OF THE DISCLOSURE

Embodiments disclosed in the detailed description include processor-based system hybrid ring bus interconnects, and related devices, processor-based systems, and methods. In this regard in one embodiment, a processor-based system hybrid ring bus interconnect is provided. The processor-based system hybrid ring bus interconnect may be an on-chip processor-based system hybrid ring bus interconnect as a non-limiting example. The processor-based system hybrid ring bus interconnect comprises a plurality of ring buses each having a bus width and configured to receive bus transaction messages from at least one requester device. The processor-based system hybrid ring bus interconnect also comprises at least one inter-ring router coupled to the plurality of ring buses. The at least one inter-ring router is configured to dynamically direct the bus transaction messages among the plurality of ring buses based on bandwidth requirements of the at least one requester device. In this manner, the processor-based system hybrid ring bus interconnect includes performance benefits of both a ring bus architecture and a crossbar interconnect architecture.

As non-limiting examples, providing multiple inter-ring routers to direct the bus transaction messages between the ring buses may result in shorter routes between a bus transaction requester and a bus transaction responder than a route of a ring bus not employing inter-ring routers. The latency of a ring bus not employing inter-ring routers has a latency based on a number of ring bus nodes participating in the ring bus. The processor-based system hybrid ring bus interconnect can also consume less power by employing simpler switching configurations, as opposed to a crossbar interconnect architecture. Additionally, providing the one or more inter-ring routers to dynamically direct bus transaction messages between the ring buses based on bandwidth requirements of the requester device(s) allows for provision of multiple ring buses that can be dynamically activated and deactivated based on bandwidth requirements. This allows for conservation of power when full bandwidth requirements on the bus interconnect are not required. Deactivating one or more of the ring buses may conserve power when bandwidth requirements can still be achieved.

In another embodiment, a processor-based system hybrid ring bus interconnect means is provided. The processor-based system hybrid ring bus interconnect means includes a plurality of ring bus means each having a bus width and configured to receive bus transaction messages from at least one requester device. The processor-based system hybrid ring bus interconnect means also comprises at least one inter-ring router means coupled to the plurality of ring bus means. The at least one inter-ring router means is configured to dynamically direct the bus transaction messages among the plurality of ring bus means based on bandwidth requirements of the at least one requester device.

In another embodiment, a method of directing bus transactions messages in a processor-based system hybrid ring bus interconnect is provided. The method comprises receiving bus transaction messages from at least one requester device. The method also comprises directing the bus transaction messages onto a ring bus among a plurality of ring buses, each of the plurality of ring buses having a bus width and configured to receive the bus transaction messages. The method also comprises dynamically directing from at least one inter-ring router coupled to the ring bus, the bus transaction messages from the ring bus to another ring bus among the plurality of ring buses based on bandwidth requirements of the at least one requester device.

In another embodiment, a resource manager for controlling a processor-based system hybrid ring bus interconnect is provided. The resource manager is configured to determine whether a plurality of bus transaction requesters are active. The resource manager is also configured to determine bandwidth requirements of each active bus transaction requester. The resource manager is also configured to calculate a topology of the processor-based system hybrid ring bus interconnect based on the bandwidth requirements of the active bus transaction requesters. The resource manager is also configured to modify a configuration of at least one inter-ring router to route bus transaction messages based on the calculated topology.

In another embodiment, a resource manager for controlling a processor-based system hybrid ring bus interconnect is provided. The resource manager comprises an active requester determination means for determining whether a plurality of bus transaction requesters are active. The resource manager also comprises a bandwidth determination means for determining bandwidth requirements of each active bus transaction requester. The resource manager also comprises calculation means for calculating a topology of the processor-based system hybrid ring bus interconnect based on the bandwidth requirements of the active bus transaction requesters. The resource manager also comprises a modification means for modifying a configuration of at least one inter-ring router to route bus transaction messages based on the calculated topology.

In another embodiment, a computer-readable medium having stored thereon computer-executable instructions to cause a resource manager to direct bus transaction messages in a processor-based system hybrid ring bus interconnect is provided. The computer-executable instructions cause the resource manager to receive the bus transaction messages from at least one requester device, direct the bus transaction messages onto a ring bus among a plurality of ring buses each having a bus width and configured to receive the bus transaction messages from the at least one requester device, direct the bus transaction messages among the plurality of ring buses through at least one inter-ring router coupled to the plurality of ring buses based on the bandwidth requirements of the at least one requester device, and determine bandwidth requirements of the at least one requester device.

DETAILED DESCRIPTION

Figure 1:
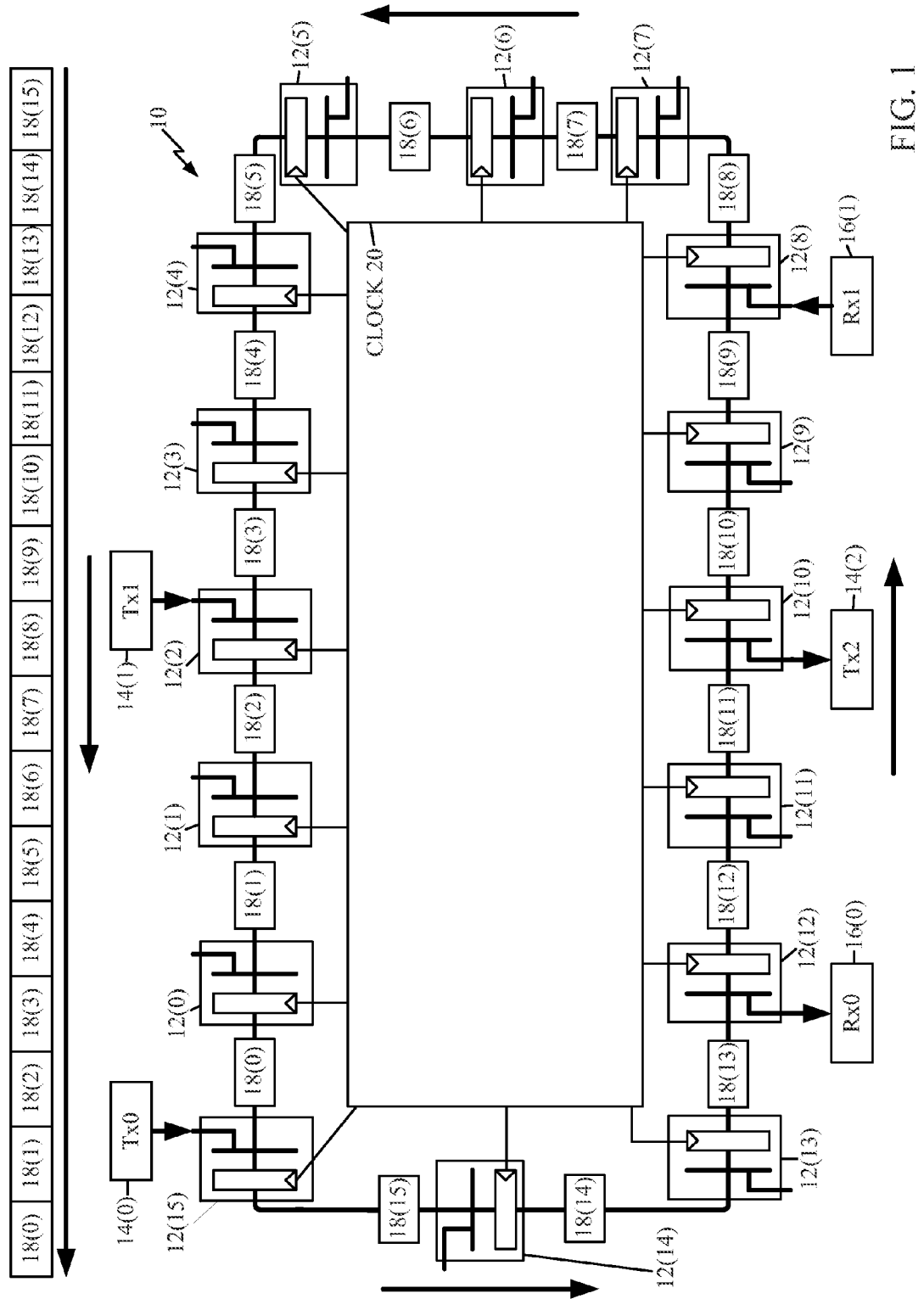
FIG. 1 is a block diagram of an exemplary ring bus for providing a bus interconnect.

With reference now to the drawing figures, several exemplary embodiments of the present disclosure are described.

The word "exemplary" is used herein to mean "serving as an example, instance, or illustration." Any embodiment described herein as "exemplary" is not necessarily to be construed as preferred or advantageous over other embodiments.

Embodiments disclosed in the detailed description include processor-based system hybrid ring bus interconnects, and related devices, processor-based systems, and methods. In this regard in one embodiment, a processor-based system hybrid ring bus interconnect is provided. The processor-based hybrid ring bus interconnect may be an on-chip processor-based system hybrid ring bus interconnect as a non-limiting example. The processor-based system hybrid ring bus interconnect includes multiple ring buses, each having a bus width and configured to receive bus transaction messages from a requester device(s). The processor-based system hybrid ring bus interconnect also includes one or more inter-ring routers coupled to the ring buses. The one or more inter-ring routers are configured to dynamically direct the bus transaction messages among the ring buses based on bandwidth requirements of the requester device(s). In this manner, the processor-based system hybrid ring bus interconnect includes performance benefits of both a ring bus architecture and a crossbar interconnect architecture.

As non-limiting examples, providing multiple inter-ring routers to direct the bus transaction messages between the ring buses may result in shorter routes between a bus transaction requester and a bus transaction responder than a route of a ring bus not employing inter-ring routers. The latency of a ring bus not employing inter-ring routers has a latency based on a number of ring bus nodes participating in the ring bus. The processor-based system hybrid ring bus interconnect can also consume less power by employing simpler switching configurations, as opposed to a crossbar interconnect architecture. Additionally, providing the one or more inter-ring routers to dynamically direct bus transaction messages between the ring buses based on bandwidth requirements of the requester device(s) allows for provision of multiple ring buses that can be dynamically activated and deactivated based on bandwidth requirements. This allows for conservation of power when the full bandwidth of the bus interconnect is not required. Deactivating one or more of the ring buses may conserve power when bandwidth requirements can still be achieved.

Figure 2:
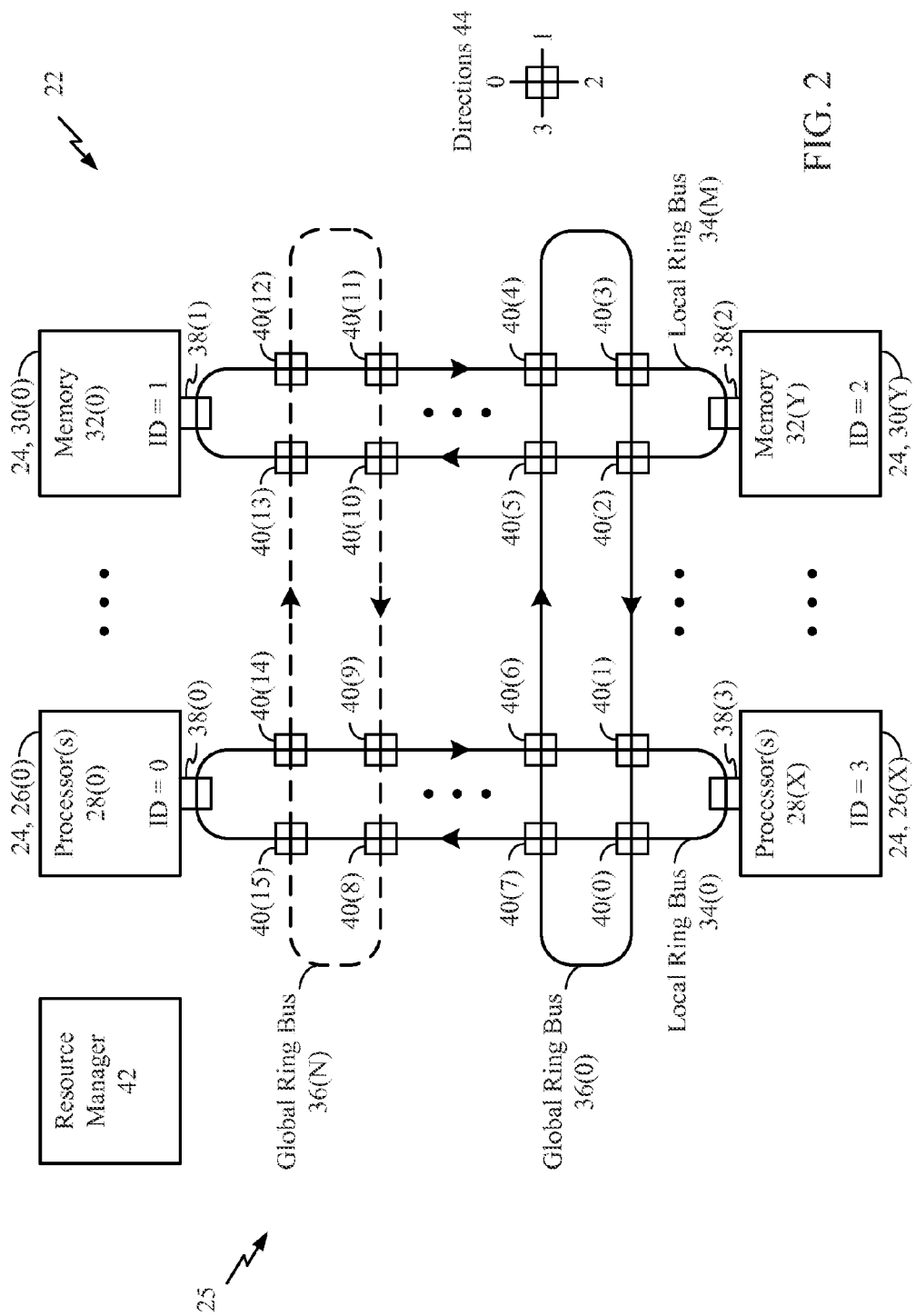
FIG. 2 is a block diagram of an exemplary on-chip hybrid ring bus interconnect including multiple ring buses, and also including inter-ring routers configured to dynamically direct bus transaction messages among the ring buses based on bandwidth requirements of a requester device(s)

In this regard, FIG. 2 illustrates an example of a processor-based system hybrid ring bus interconnect 22. In this example in FIG. 2, the processor-based system hybrid ring bus interconnect 22 is an on-chip hybrid ring bus interconnect 22, and thus will be referred to in this example as "on-chip hybrid ring bus interconnect 22." On-chip, as used herein, means the hybrid ring bus interconnect can be provided in an integrated circuit (IC) integrated with other components of a computer or other processor-based system in a chip or series of chips. As a non-limiting example, on-chip hybrid ring bus interconnect 22 can be provided in a system-on-a-chip (SOC). However, note that the disclosure and embodiments disclosed herein are not limited to the hybrid ring bus interconnects being an on-chip hybrid ring bus interconnect.

With continuing reference to FIG. 2, the on-chip hybrid ring bus interconnect 22 interconnects bus transaction participants 24 within a system-on-a-chip (SOC) provided in at least one semiconductor die 25 for communications in this example. The bus transaction participants 24 include a number of bus transaction requesters 26, also referred to as "bus masters." For example, the bus transaction requesters 26(0)-26(X) may further comprise processors 28(0)-28(X). The bus transaction participants 24 also include a number of bus transaction responders 30(0)-30(Y), also referred to as "bus slaves." For example, the bus transaction responders 30(0)-30(Y) may comprise memory nodes 32(0)-32(Y). The on-chip hybrid ring bus interconnect 22 is comprised of a plurality of local ring buses 34(0)-34(M) and global ring buses 36(0)-36(N). As illustrated in FIG. 2, the global ring buses 36 may span across all of the local ring buses 34(0)-34(M) in central processing unit (CPU) architecture. Point-to-point communications can occur between two participant nodes 38 on a certain local ring bus 34 if the local ring bus 34 interconnects the two participant nodes 38. If not, an inter-ring router 40 (e.g., 40(0)) can route a bus transaction message 18 (not shown) from one ring bus (e.g., local ring bus 34(0)) to another ring bus (e.g., global ring bus 36(0)) in order to reach a desired destination. A resource manager 42 may be provided to control routing of the inter-ring routers 40. Exemplary routing directions 44, to which a bus transaction message 18 may be routed by an inter-ring router 40, are noted in FIG. 2.

Because the routes of the inter-ring routers 40(0)-40(15) may be changed, one or more global ring buses (e.g., global ring bus 36(N)) may be deactivated to save power if ring bus performance will reach an acceptable level. When the global ring bus 36(N) is deactivated, the routes of the inter-ring routers 40 are set to ensure delivery of the bus transaction messages 18 through other ring buses (e.g., local ring buses 34 and/or global ring buses 36). The global ring bus 36(N) may also be reactivated to increase performance. When the global ring bus 36(N) is reactivated, the routes of the inter-ring routers 40 are set to increase the performance of delivering the bus transaction messages 18 in order to achieve increased performance, although with a tradeoff of increased power consumption. For example, the routes of the inter-ring routers 40 may be controlled to provide a shortened path(s) and/or a reduced contention path(s) for the bus transaction message(s) 18 traversing the on-chip hybrid ring bus interconnect 22. When traversing a reduced contention path, the bus transaction message(s) 18 may also avoid queuing delays and/or incur shorter queuing delays than when traversing an increased contention path. As a result of the shortened path(s) and/or the reduced contention path(s), delivery throughput of the bus transaction messages 18 may be increased.

Figure 3A:
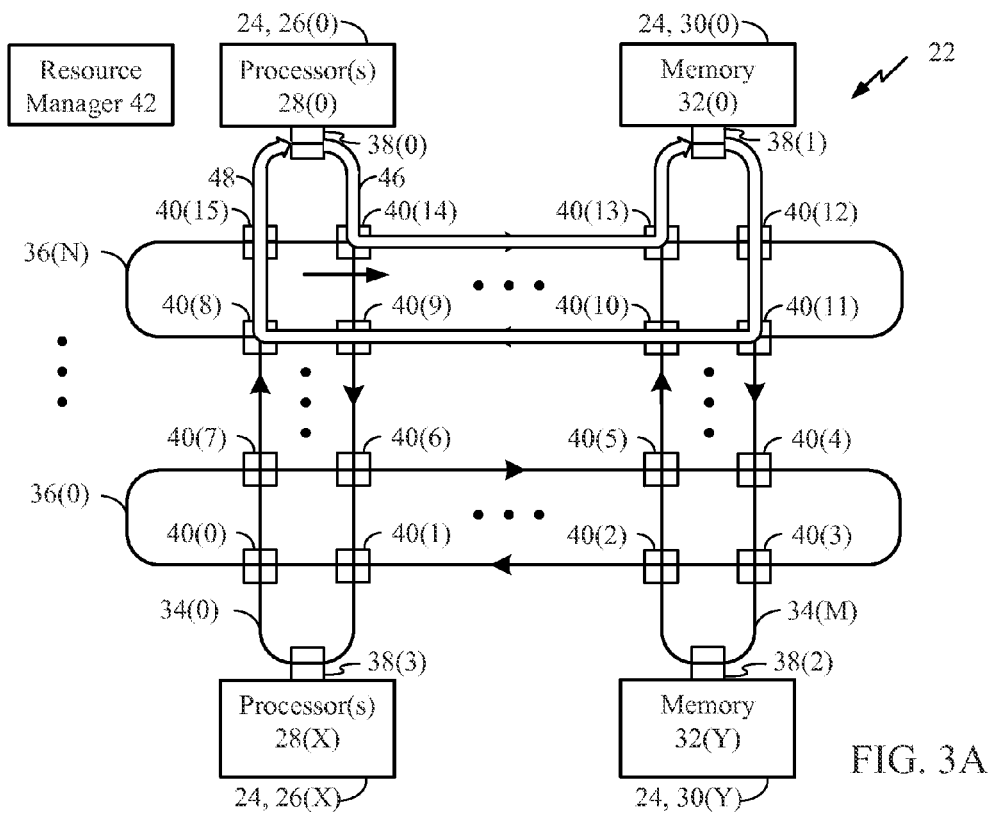
FIG. 3A is a block diagram illustrating exemplary routes of bus transaction messages through the processor-based system hybrid ring bus interconnect of FIG. 2, when all ring buses are activated.
Figure 3B:
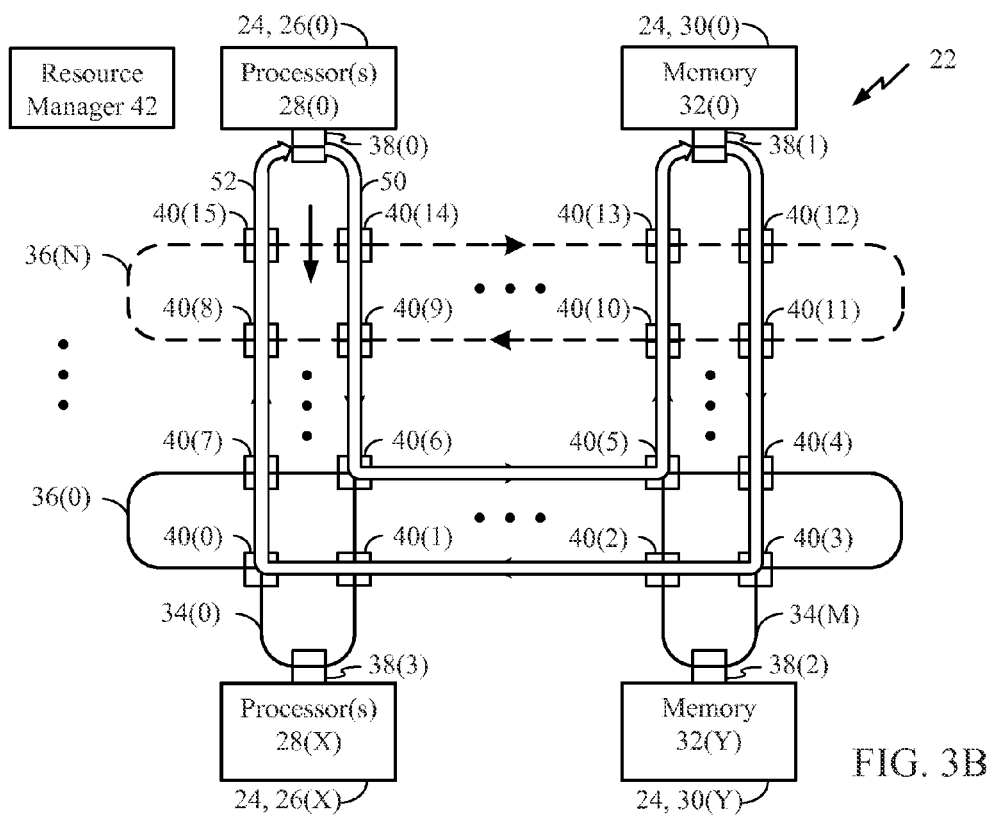
FIG. 3B is a block diagram illustrating exemplary alternative routes of bus transaction messages through the processor-based system hybrid ring bus interconnect of FIG. 2, after a global ring bus has been deactivated.

If bandwidth requirements of the bus transaction requesters 26(0)-26(X) require increased performance, all ring buses (e.g., all local ring buses 34(0)-34(M) and/or all global ring buses 36(0)-36(N)) of the on-chip hybrid ring bus interconnect 22 may be activated to provide for maximum flexibility in routing the bus transaction messages 18. In this regard as described in more detail below, FIG. 3A illustrates exemplary routes 46, 48 of the bus transaction messages 18 through the on-chip hybrid ring bus interconnect 22 of FIG. 2, when all of the ring buses 34, 36 are activated. However, if the bandwidth requirements of the bus transaction requesters 26 permit reduced performance, certain ring buses (e.g., global ring bus 36(N)) may be deactivated to save power. As a result, the bus transaction messages 18 may be routed through longer paths and/or more contentious paths than would otherwise be possible if all of the ring buses 34, 36 were active. In this regard as described in more detail below, FIG. 3B illustrates exemplary alternative routes 50, 52 of the bus transaction messages 18 through the on-chip hybrid ring bus interconnect 22 of FIG. 2, after the global ring bus 36(N) is deactivated.

Referring now back to FIG. 3A, exemplary routes 46, 48 of the bus transaction messages 18 through the on-chip hybrid ring bus interconnect 22 of FIG. 2 are shown when all of the ring buses 34, 36 of the on-chip hybrid bus interconnect 22 are active. In FIG. 3A, a bus transaction request message (not shown) from the bus transaction requester 26(0) to the bus transaction responder 30(0) is routed along the route 46 by the on-chip hybrid ring bus interconnect 22. In this regard, the bus transaction request message is routed from participant node 38(0) to the inter-ring router 40(14). The inter-ring router 40(14) routes the bus transaction request message onto the global ring bus 36(N). Inter-ring router 40(13) then routes the bus transaction request message onto the local ring bus 34(M) to participant node 38(1), where it is received by the bus transaction responder 30(0). In response, the bus transaction responder 30(0) transmits to the bus transaction requester 26(0) a bus transaction response message (not shown), which is routed along the route 48. The bus transaction response message is transmitted from participant node 38(1) onto local ring bus 34(M). Inter-ring router 40(11) then routes the bus transaction response message onto the global ring bus 36(N). Inter-ring router 40(8) then routes the bus transaction response message onto the local ring bus 34(0). The bus transaction response message is received by the participant node 38(0) and delivered to the bus transaction requester 26(0).

If bandwidth requirements of the bus transaction requesters 26(0)-26(X) permit reduced performance, one or more ring buses (e.g., global ring bus 36(N) may be deactivated to conserve power. The bandwidth requirements may permit reduced performance because one or more bus transaction requesters 26(0)-26(X) is deactivating (e.g., powering down and/or powering off) and/or because the CPU is entering a lower-power mode. Because portions of the on-chip hybrid ring bus interconnect 22 may be deactivated, the on-chip hybrid ring bus interconnect 22 may consume less power. However, when the one or more ring buses (e.g., global ring bus 36(N) are deactivated, the bus transaction messages 18 (e.g. the bus transaction request message(s) and/or the bus transaction response message(s)) may be routed through longer paths and/or more contentious paths than the routes 46, 48 illustrated in FIG. 3A.

In this regard. FIG. 3B illustrates exemplary alternative routes 50, 52 of the bus transaction messages 18 through the on-chip hybrid ring bus interconnect 22 of FIG. 2, after the global ring bus 36(N) is deactivated. Because the global ring bus 36(N) is deactivated in FIG. 3B, the bus transaction request message from bus transaction requester 26(0) to bus transaction responder 30(0) is now routed along the alternate route 50 (different from the route 46 shown in FIG. 3A). The alternative route 50 in FIG. 3B is longer than the route 46 shown in FIG. 3A. However, the on-chip hybrid ring bus interconnect 22 may also consume less power when the global ring bus 36(N) is deactivated.

In FIG. 3B, the bus transaction request message is transmitted onto the local ring bus 34(0) by the participant node 38(0). Inter-ring router 40(14) maintains the bus transaction request message on the local ring bus 34(0), instead of routing it to global ring bus 36(N) as in FIG. 3A. Inter-ring router 40(6) then routes the bus transaction request message onto the global ring bus 36(0). Inter-ring router 40(5) then routes the bus transaction request message onto the local ring bus 34(M). The bus transaction request message is received by the participant node 38(1) and delivered to the bus transaction responder 30(0).

In response, the bus transaction responder 30(0) transmits to the bus transaction requester 26(0) the bus transaction response message. Because the global ring bus 36(N) is deactivated in FIG. 3B, the bus transaction response message from the bus transaction responder 30(0) to the bus transaction requester 26(0) is now routed along the alternate route 52 (different from the route 48 shown in FIG. 3A). The alternative route 52 in FIG. 3B is also longer than the route 48 shown in FIG. 3A. However, the on-chip hybrid ring bus interconnect 22 may also consume less power when the global ring bus 36(N) is deactivated. In this regard, the bus transaction response message is transmitted from participant node 38(1) onto local ring bus 34(M). Inter-ring router 40(11) maintains the bus transaction response message on local ring bus 34(M) instead of routing it to the global ring bus 36(N) as in FIG. 3A). Inter-ring router 40(3) then routes the bus transaction response message onto the global ring bus 36(0). Inter-ring router 40(0) then routes the bus transaction response message onto the local ring bus 34(0). The bus transaction response message is received by the participant node 38(0) and delivered to the bus transaction requester 26(0).

Thus, the on-chip hybrid ring bus interconnect 22 in FIGS. 2, 3A, and 3B has advantages over both a simple ring bus 10 (illustrated in FIG. 1), which does not employ inter-ring routers 40, and a crossbar interconnect, which does not employ ring buses 10 and/or inter-ring routers 40. Because the on-chip hybrid ring bus interconnect 22 employs the inter-ring routers 40, the bus transaction messages 18 may be transmitted along a shorter route than would be possible if transmitted along the simple ring bus 10. As a result, the on-chip hybrid ring bus interconnect 22 may experience a higher throughput than the simple ring bus 10. Furthermore, when transmitted on the simple ring bus 10, the bus transaction messages 18 may contend for a same portion of the simple ring bus 10. However, when transmitted on the on-chip hybrid ring bus interconnect 22, the bus transaction messages 18 also may experience less contention than with the simple ring bus 10. In this regard, when traversing a reduced contention route, the bus transaction messages 18 may avoid queuing delays and/or incur shorter queuing delays than when traversing an increased contention route. As a result of the shorter routes and/or the reduced contention routes of the on-chip hybrid ring bus interconnect 22, delivery throughput of the bus transaction messages 18 is increased. For this additional reason, the on-chip hybrid ring bus interconnect 22 may experience a higher throughput than the simple ring bus 10.

The on-chip hybrid ring bus interconnect 22 also has advantages over a crossbar interconnect, which does not employ ring buses 10 and inter-ring routers 40. The inter-ring routers 40 of the on-chip hybrid ring bus interconnect 22 may be implemented using simpler switches than a crossbar interconnect. For example, each inter-ring router 40 may be implemented as a two-port crossbar switch. However, a crossbar interconnect may require crossbar switches having more than two input and output ports. Furthermore, the on-chip hybrid ring bus interconnect 22 may consume less power than a crossbar interconnect. For example, when one or more ring buses 34, 36 of the on-chip hybrid ring bus interconnect 22 are deactivated, the on-chip hybrid ring bus interconnect 22 may consume less power than a crossbar interconnect. Also, the on-chip hybrid ring bus interconnect 22 may be operated at a higher frequency than a crossbar interconnect. This is because a maximum frequency at which the on-chip hybrid ring bus interconnect 22 may be operated may depend upon a maximum distance between adjacent inter-ring routers 40.

Figure 4:
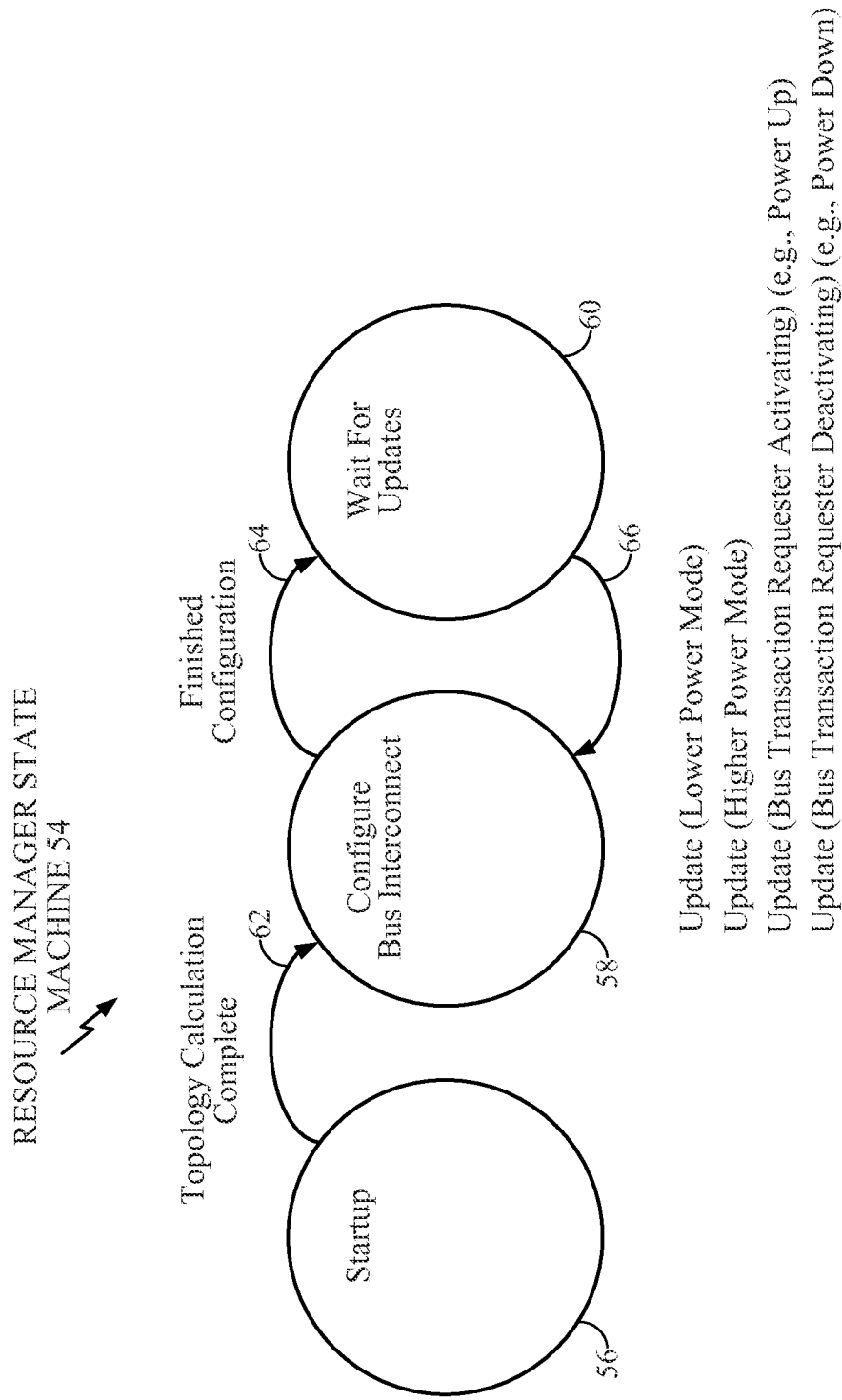
FIG. 4 illustrates an exemplary state machine of a resource manager configured to control inter-ring router(s) of the processor-based system hybrid ring bus interconnect(s) of FIGS. 2, 3A, and 3B to dynamically direct bus transaction messages among the plurality of ring buses based on bandwidth requirements of at least one requester device.
Figure 5:
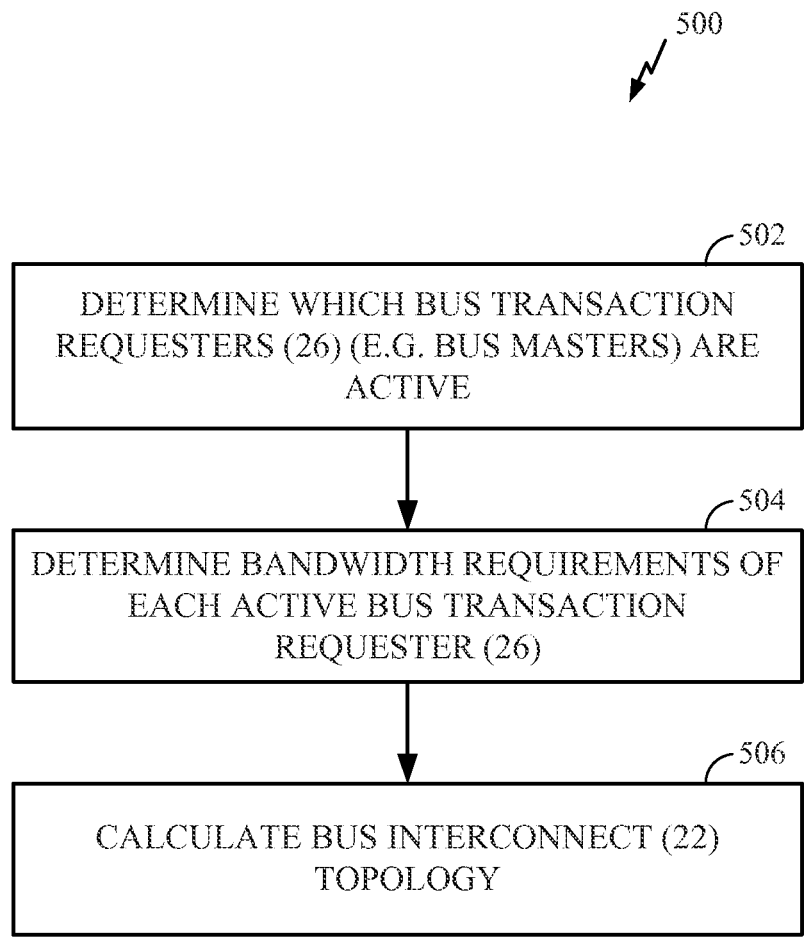
FIG. 5 illustrates a flowchart of an exemplary method of a resource manager that may be performed during a startup state of the state machine of FIG. 4.
Figure 6:
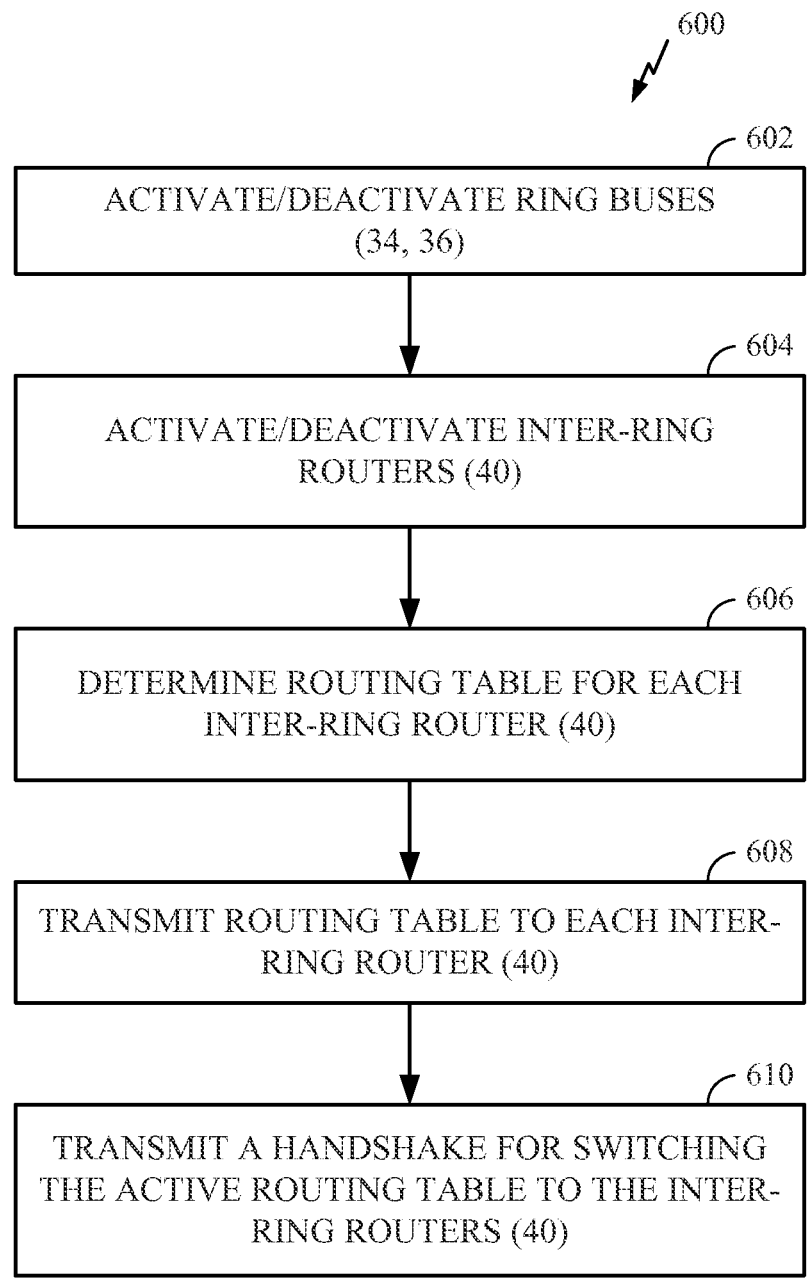
FIG. 6 illustrates a flowchart of an exemplary method of a resource manager that may be performed during a configure bus interconnect state of the state machine of FIG. 4.

The routing of the inter-ring routers 40 may be controlled by the resource manager 42. Referring now to FIGS. 4-6, an exemplary resource manager state machine 54 (FIG. 4), and accompanying resource manager methods 500, 600 (FIGS. 5-6) are provided. The resource manager state machine 54 illustrated in FIG. 4 comprises three states: a startup state 56, a configure bus interconnect state 58, and a wait for updates state 60. The resource manager state machine 54 begins in the startup state 56. FIG. 5 illustrates an exemplary method 500 of the resource manager state machine 54 that may be performed during the startup state 56. In order to control the routing of the inter-ring routers 40, the resource manager state machine 54 may determine which bus transaction requesters 26 are active (block 502). The resource manager state machine 54 may also lookup the bandwidth requirements of the active bus transaction requesters 26 (block 504). Based on the bandwidth requirements of the active bus transaction requesters 26, the resource manager state machine 54 may calculate a bus interconnect topology for routing the bus transaction messages 18 through the ring buses 34, 36 of the on-chip hybrid ring bus interconnect 22 (block 506).

Upon completing the bus interconnect topology calculation, the resource manager state machine 54 may transition to the configure bus interconnect state 58 (transition 62 of FIG. 4). FIG. 6 illustrates an exemplary method 600 of the resource manager state machine 54 that may be performed during the configure bus interconnect state 58. In this regard, the resource manager state machine 54 may reconfigure the on-chip hybrid ring bus interconnect 22 to the determined topology. For example, the resource manager state machine 54 may activate and/or deactivate one or more of the ring buses 34, 36 independently (block 602). The resource manager state machine 54 may further activate and/or deactivate one or more of the inter-ring routers 40 (block 604).

With continuing reference to FIG. 6, the resource manager state machine 54 may next determine a routing table for each inter-ring router 40 (block 606). Examples of routing tables will be discussed below in regard to FIGS. 7 and 8. The resource manager 42 may also transmit the routing tables to the inter-ring routers 40 and/or otherwise configure the inter-ring routers 40 to route the bus transaction messages 18 according to the routing tables (block 608). In addition, in resource manager state machine 54, the resource manager 42 may also transmit a handshake message to the inter-ring routers 40 (block 610). The handshake message indicates to the inter-ring routers 40 that there will be an update to the active routing tables and that the inter-ring routers 40 must quiesce bus transaction messages 18 before acknowledgment to the resource manager 42. Once all the inter-ring routers 40 affected by reconfiguration have indicated that their bus transaction messages 18 are quiesced, the resource manager 42 can indicate to the inter-ring routers 40 that updating of routing tables are permitted. After the method 600 completes, the resource manager state machine 54 transitions to the wait for updates state 60 (transition 64 of FIG. 4).

Upon receiving an update, the resource manager state machine 54 again determines the bandwidth requirements of each active bus transaction requester 26 (after the update), and recalculates the bus interconnect topology of the on-chip hybrid ring bus interconnect 22 (transition 66 of FIG. 4). Upon re-entering the configure bus interconnect state 58, the resource manager state machine 54 again executes the method 600 of FIG. 6. Various updates may trigger the recalculation and reconfiguring of the bus interconnect topology of the on-chip hybrid ring bus interconnect 22. As non-limiting examples, a lower power mode update, a higher power mode update, an update that a bus transaction requester 26 is activating (e.g., powering up), and/or an update that a bus transaction requester 26 is deactivating (e.g., powering down) may each trigger the transition 66. For example, the resource manager state machine 54 may deactivate the global ring bus 36(N) in response to receiving a lower power mode update. The resource manager state machine 54 may subsequently reactivate the global ring bus 36(N) in response to receiving a higher power mode update.

Figure 7:
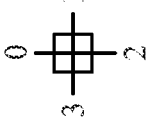
FIG. 7 illustrates an exemplary routing table for an inter-ring router of a processor-based system hybrid ring bus interconnect, including the bus interconnect in FIG. 3A.
Figure 8:
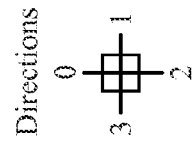
FIG. 8 illustrates another exemplary routing table for an inter-ring router of a processor-based system hybrid ring bus interconnect, including the bus interconnect in FIG. 3B.

FIGS. 7 and 8 illustrate exemplary routing tables 68(1), 68(2) for an inter-ring router 40 of the on-chip hybrid ring bus interconnect 22. As illustrated in FIG. 7, the routing table 68(1) update for each inter-ring router 40 may include directions 70 to route various bus transaction messages 18. The routing directions 70 may be based on the destination of the bus transaction message 18 (destination identifier 72) and/or the source of the bus transaction message 18 (source identifier 74). The resource manager state machine 54 may also frequency scale each of the ring buses 34, 36 independently. In this regard, the routing table 68(1) may also specify a bus frequency data rate 76 (e.g., single data rate (SDR) or double data rate (DDR)) at which to forward the bus transaction message 18. When the bus frequency data rate 76 is set to SDR, the inter-ring routers 40 of the on-chip hybrid ring bus interconnect 22 may forward the bus transaction messages 18 once each clock cycle. When the bus frequency date rate 76 is set to DDR, the inter-ring routers 40 of the on-chip hybrid ring bus interconnect 22 may forward the bus transaction messages 18 once each clock beat (i.e. twice each clock cycle). The routing table 68(1) may also specify a bus width 78 (as non-limiting examples, 32 bits, 64 bits, 128 bits, etc.) to use to forward the bus transaction messages 18.

As a non-limiting example, the routing table 68(1) may be a routing table of the inter-ring router 40(14) of FIGS. 2-3B. FIG. 7 illustrates an inter-ring router routing table 68(1) for the inter-ring router 40(14) when the global ring bus 36(N) is activated (FIG. 3A). As shown in the first entry of the inter-ring router routing table 68(1) in FIG. 7, when the global ring bus 36(N) is activated, the routing direction of the inter-ring router 40(14) will be '1', or right as shown in FIG. 3A, for source identifier 0 (in column 74) and destination identifier 1 (in column 72). FIG. 8 illustrates another inter-ring router routing table 68(2) for the inter-ring router 40(14) after the global ring bus 36(N) is deactivated (FIG. 3B). As shown in the first entry of the inter-ring router routing table 68(2) in FIG. 8, when the global ring bus 36(N) is deactivated, the routing direction of the inter-ring router 40(14) will be '2', or down as shown in FIG. 3B, for source identifier 0 (in column 74) and destination identifier 1 (in column 72). Each inter-ring router 40 may comprise a routing table 68(1), 68(2), or be configured according to the routing table 68(1), 68(2).

Furthermore, each inter-ring router 40 may comprise an active routing table and a shadow routing table. The active routing table may be used for routing the bus transaction messages 18 while the shadow routing table is being loaded by the resource manager state machine 54. When loading of the shadow routing table is completed, the shadow routing table may be switched for use as the active routing table of the inter-ring router 40.

Figure 9:
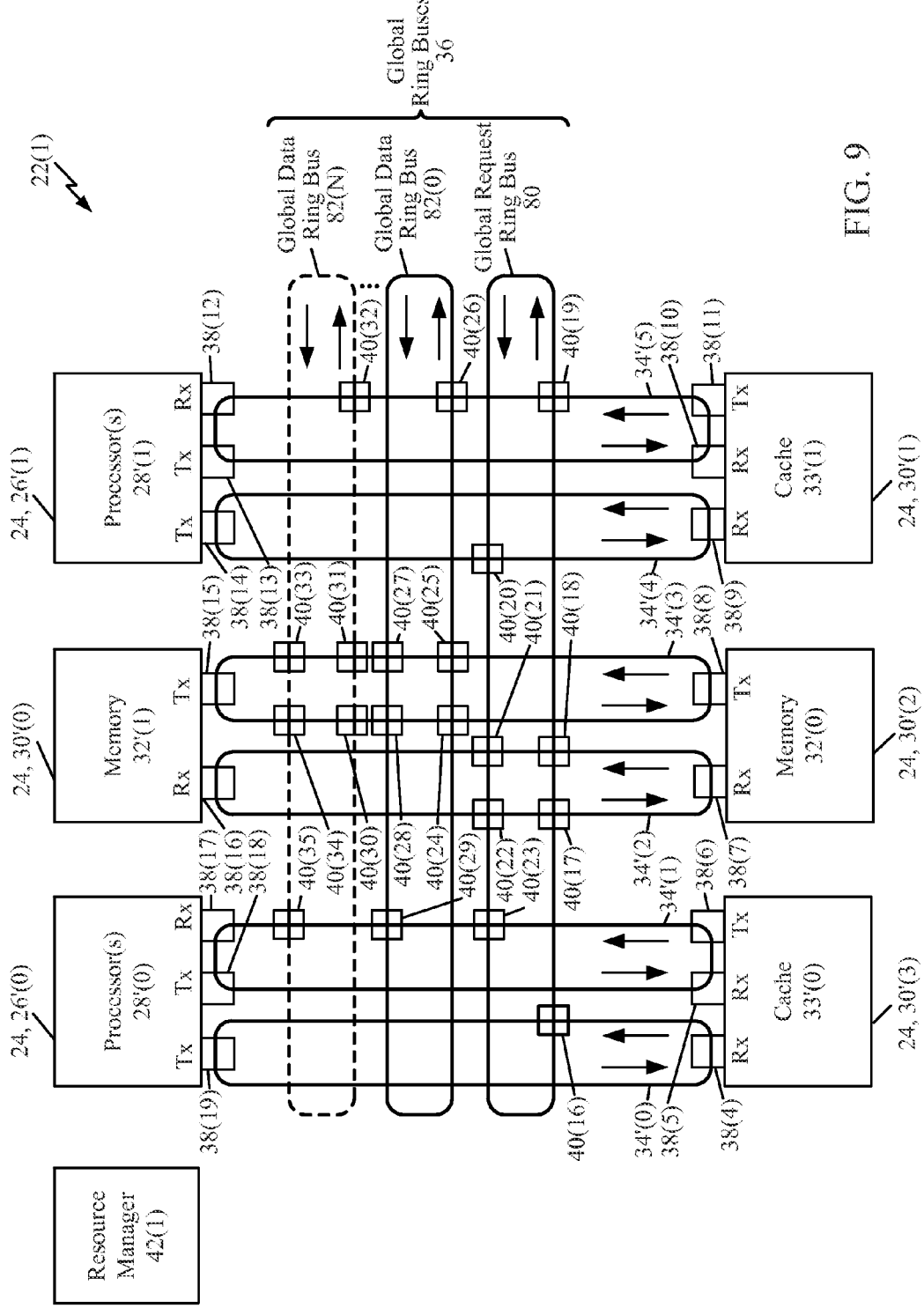
FIG. 9 is a block diagram of another exemplary processor-based system hybrid ring bus interconnect including multiple ring buses, and also including inter-ring routers configured to dynamically direct bus transaction messages among the ring buses based on bandwidth requirements of a requester device(s)

FIG. 9 illustrates another example of an on-chip hybrid ring bus interconnect 22(1) as an example of a processor-based hybrid ring bus interconnect. Like elements having like elements numbers are the same or similar except as otherwise described. The on-chip hybrid ring bus interconnect 22(1) in FIG. 9 interconnects bus transaction participants 24 within a system-on-a-chip (SOC) for communications in this example. The bus transaction participants 24 include bus transaction requesters 26' (e.g., 26'(0)-26'(1)), also referred to as "bus masters." For example, the bus transaction requesters 26' may further comprise processors 28' (e.g., 28'(0)-28'(1)). The bus transaction participants 24 also include bus transaction responders 30' (e.g., 30'(0)-30'(3)), also referred to as "bus slaves." For example, the bus transaction requesters 30' may comprise memory nodes 32' (e.g., 32'(0)-32'(1)) and/or caches 33' (e.g., 33'(0)-33'(1)). The on-chip hybrid ring bus interconnect 22(1) is comprised of local ring buses 34' (e.g., 34'(0)-34'(5)) and global ring buses 36. In FIG. 9, the global ring buses 36 comprise one global request ring bus 80 and two or more global data ring buses 82(0)-82(N). As illustrated in FIG. 9, the global ring buses 36 may span across all local ring buses 34' in central processing unit (CPU) architecture. Point-to-point communications can occur between two participant nodes 38 on a local ring bus 34' if the local ring bus 34' interconnects the two participant nodes 38. If not, an inter-ring router 40 (e.g., 40(16)) can route a bus transaction message 18 from one ring bus (e.g., local ring bus 34'(0)) to another ring bus (e.g., global request ring bus 80) in order to reach a desired destination. A resource manager 42(1) may be provided to control the routing of the inter-ring routers 40.

Because the routes of the inter-ring routers 40 may be changed, one or more global ring buses (e.g., global data ring bus 82(N)) may be deactivated to save power. When the global ring bus 82(N) is deactivated, the routes of the inter-ring routers 40 are set to ensure delivery of the bus transaction messages 18 through other ring buses 34', 36. The global ring bus 82(N) may also be reactivated to increase performance. When the global ring bus 82(N) is reactivated, the routes of the inter-ring routers 40 are set to increase the performance of delivering the bus transaction messages 18 in order to achieve increased performance, with a tradeoff of increased power consumption. For example, the routes of the inter-ring routers 40 may be controlled to provide a shortened path(s) and/or a reduced contention path(s) for the bus transaction messages 18 traversing the on-chip hybrid ring bus interconnect 22(1).

Figure 10:
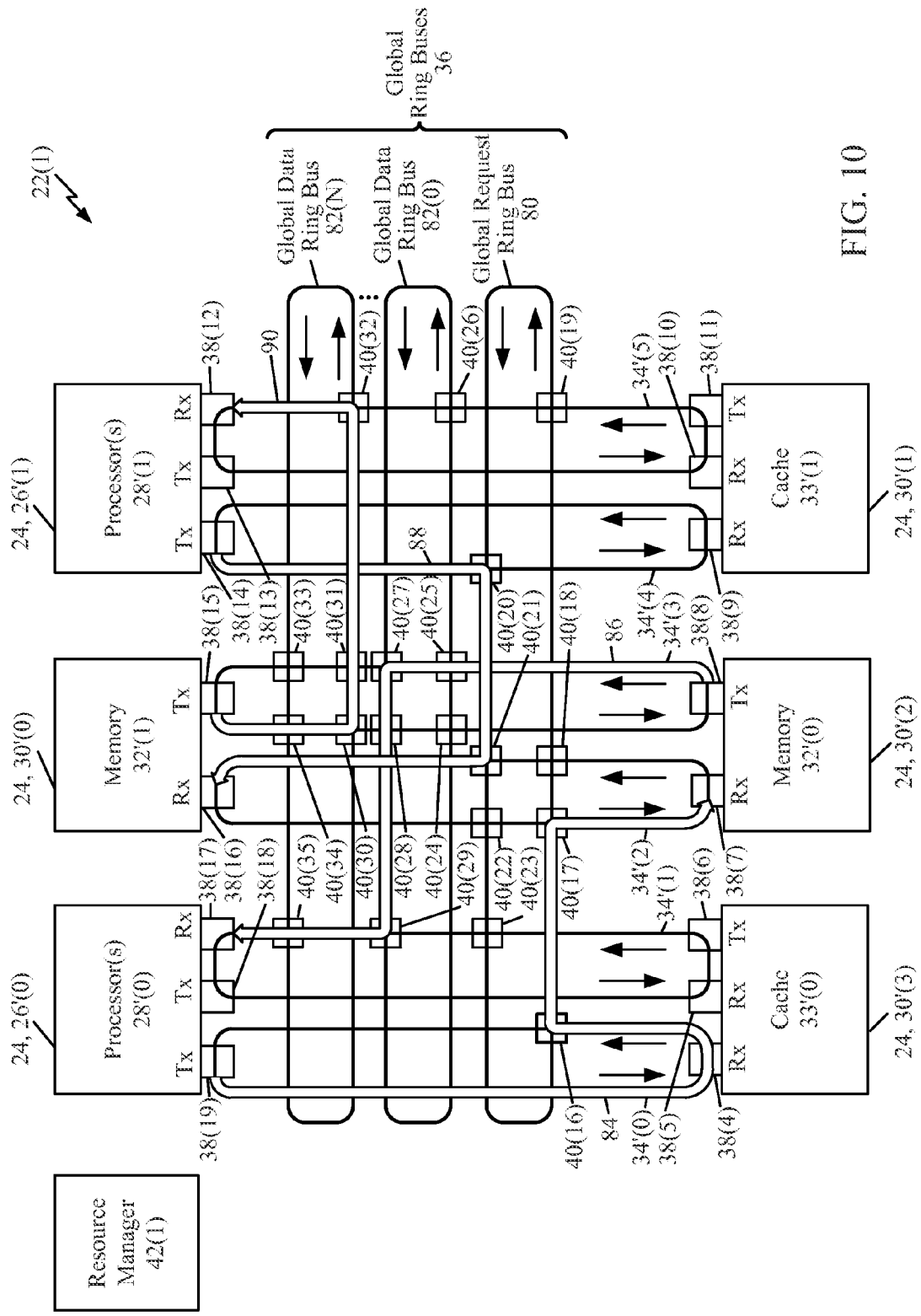
FIG. 10 is a block diagram illustrating exemplary routes of bus transaction messages through the processor-based system hybrid ring bus interconnect of FIG. 9, when all ring buses are activated.

If bandwidth requirements of the bus transaction requesters 26' require increased performance, all ring buses 34', 36 of the on-chip hybrid ring bus interconnect 22(1) may be activated to provide for maximum flexibility in routing the bus transaction messages 18. In this regard as described in more detail below, FIG. 10 illustrates exemplary routes 84, 86, 88, 90 of the bus transaction messages 18 through the on-chip hybrid ring bus interconnect 22(1) of FIG. 9, when all ring buses 34', 36 are activated. However, if the bandwidth requirements of the bus transaction requesters 26' permit reduced performance, certain ring buses (e.g., global data ring bus 82(N)) may be deactivated to save power. As a result, the bus transaction messages 18 may be routed through longer paths and/or more contentious paths than would otherwise be possible if all ring buses 34', 36 were active.

Referring now to FIG. 10, exemplary routes of the bus transaction messages 18 through the on-chip hybrid ring bus interconnect 22(1) of FIG. 9 are shown when all ring buses 34', 36 of the on-chip hybrid ring bus interconnect 22(1) are active. In this example, a bus transaction request message (not shown) from bus transaction requester 26'(0) to a bus transaction responder 30'(2) is routed along a route 84 by the on-chip hybrid ring bus interconnect 22(1). In this regard, the bus transaction request message is routed from participant node 38(19) along local ring bus 34'(0) through participant node 38(4) to an inter-ring router 40(16). The inter-ring router 40(16) routes the bus transaction request message onto the global request ring bus 80. Inter-ring router 40(17) then routes the bus transaction request message onto local ring bus 34'(2) to participant node 38(7), where it is received by bus transaction responder 30'(2). In response, the bus transaction responder 30'(2) transmits a bus transaction response message (not shown), that is routed along a route 86. The bus transaction response message is transmitted from participant node 38(8) onto local ring bus 34'(3). Inter-ring router 40(27) routes the bus transaction response message onto the global data ring bus 82(0). Inter-ring router 40(29) then routes the bus transaction response message onto local ring bus 34'(1). The bus transaction response message is received by participant node 38(17).

With continuing reference to FIG. 10, a second bus transaction request message (not shown) is transmitted along a route 88. In this regard, the second bus transaction request message is transmitted from bus transaction requester 26'(1) onto local ring bus 34'(4). Inter-ring router 40(20) routes the second bus transaction request message onto the global request ring bus 80. Inter-ring router 40(21) routes the second bus transaction request message onto local ring bus 34'(2), where it is received by bus transaction responder 30'(0). In response, the bus transaction responder 30'(0) transmits a second bus transaction response message (not shown) onto local ring bus 34'(3). The second bus transaction response message is routed along a route 90. In this regard, inter-ring router 40(30) routes the second bus transaction response message onto the global data ring bus 82(N). Inter-ring router 40(32) routes the second bus transaction response message onto local ring bus 34'(5), from which it is received by participant node 38(12) of bus transaction responder 26'(1).

Figure 11:
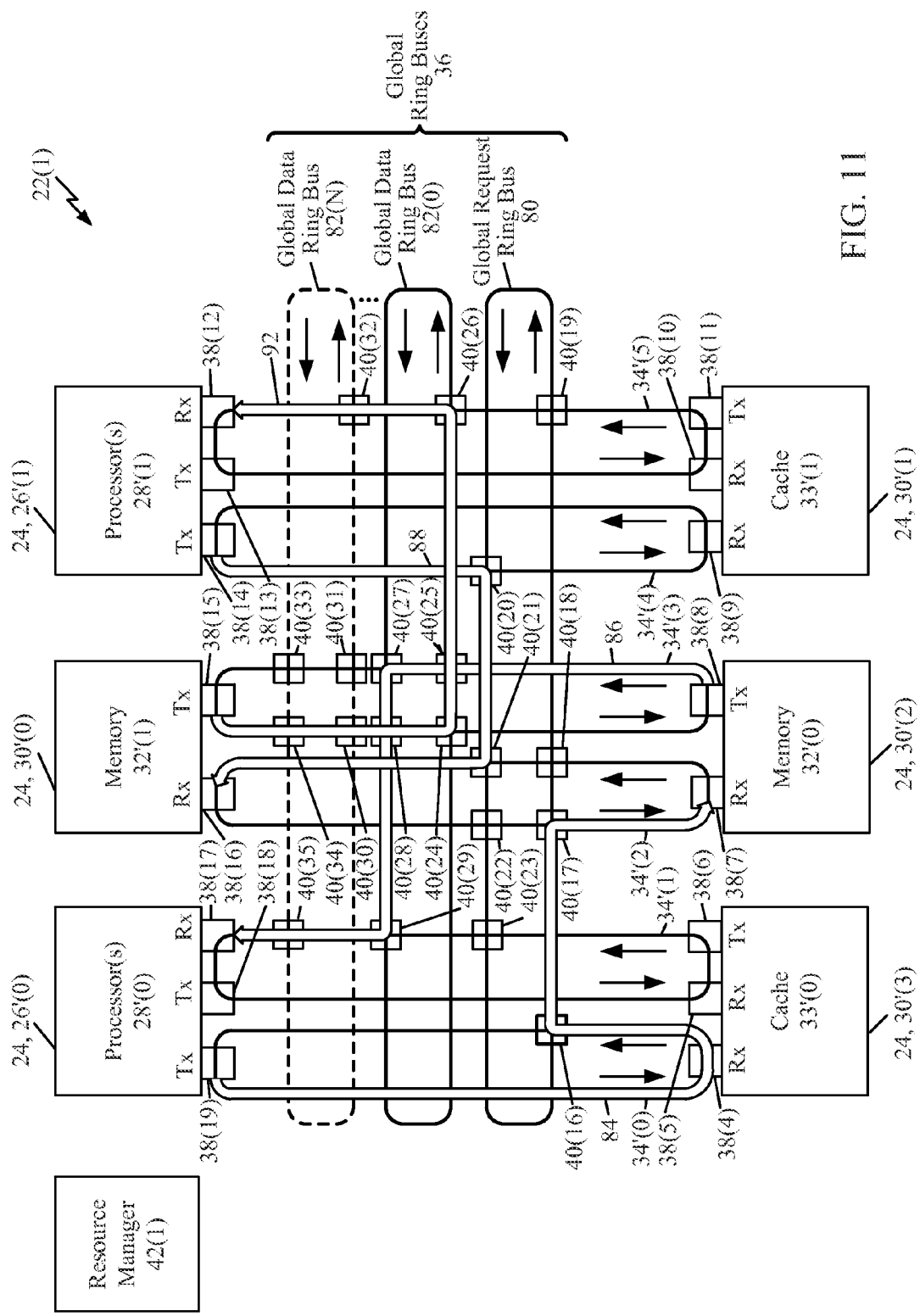
FIG. 11 is a block diagram illustrating exemplary alternative routes of bus transaction messages through the processor-based system hybrid ring bus interconnect of FIG. 9, after a global ring bus has been deactivated.

FIG. 11 illustrates exemplary alternative routes of bus transaction messages 18 through the on-chip hybrid ring bus interconnect 22(1) of FIGS. 9 and 10, after a global ring bus 36 (here, global data ring bus 82(N)) has been deactivated. In FIG. 11, routes 84, 86, and 88 are the same as in FIG. 10. However, the second bus transaction response message is now routed along an alternate route 92 (different from the route 90 shown in FIG. 10). The alternate route 92 in FIG. 11 is also longer than the route 90 shown in FIG. 10. In this regard in FIG. 11, inter-ring router 40(30) maintains the second bus transaction response message on local ring bus 34'(3) instead of routing it to global data ring bus 82(N) as in FIG. 10. Inter-ring router 40(24) routes the second bus transaction response message onto the global data ring bus 82(0). Inter-ring router 40(26) routes the second bus transaction response message onto local ring bus 34'(5), where the second bus transaction response message is received by the participant node 38(12).

Figure 12:
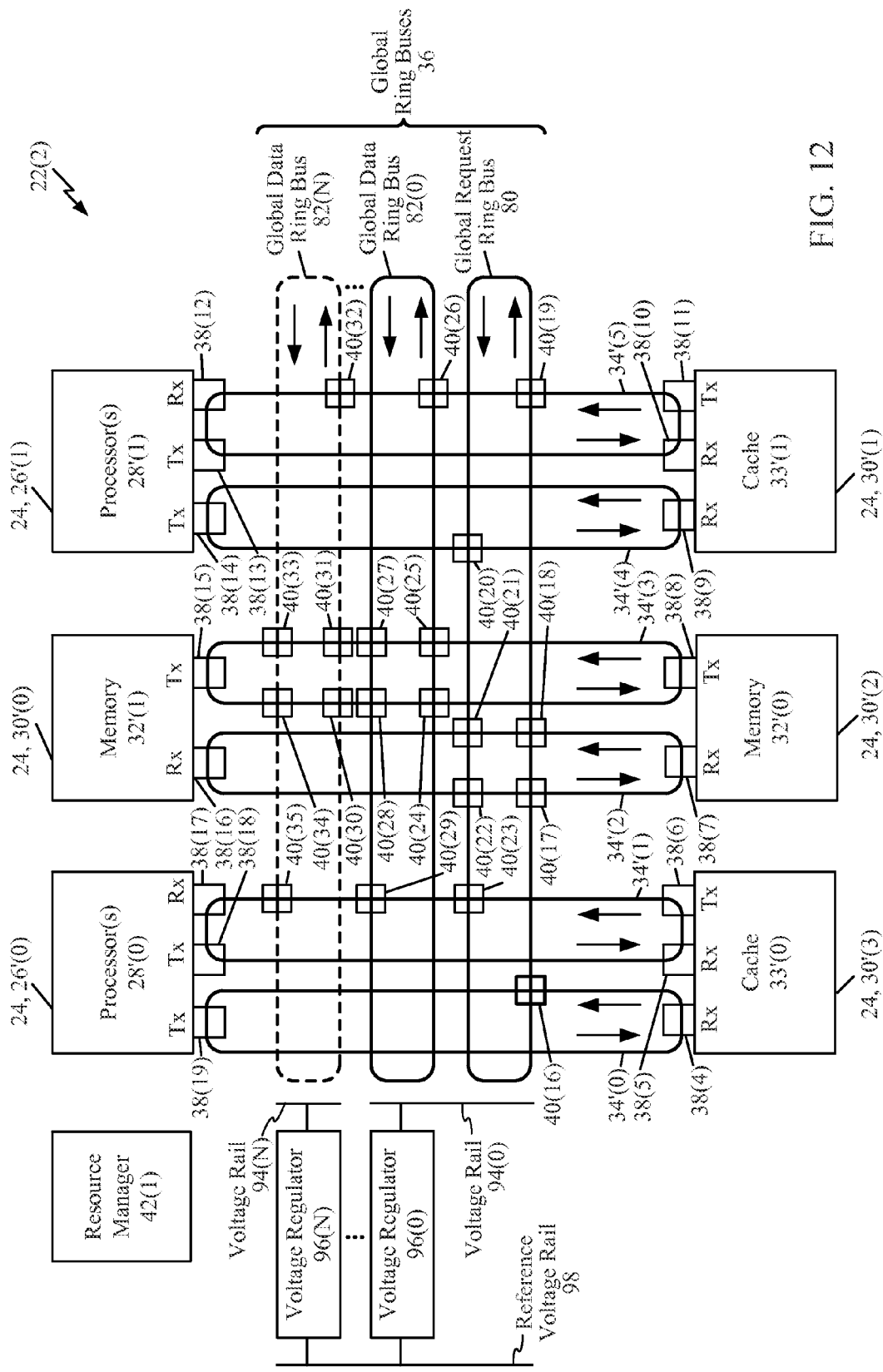
FIG. 12 is a block diagram illustrating the processor-based system hybrid ring bus interconnect of FIG. 9, including different voltage rails for powering different ring buses of the processor-based system hybrid ring bus interconnect.

Referring now to FIG. 12, in order to deactivate the one or more global ring buses 36, an on-chip hybrid ring bus interconnect 22(2) may comprise two or more different voltage rails 94 (e.g., 94(0)-94(N)). Each of the global ring buses 36 of the on-chip hybrid ring bus interconnect 22(2) may be powered by one of the two or more different voltage rails 94(0)-94(N). Thus, each global ring bus 36 of the on-chip hybrid ring bus interconnect 22(2) may be deactivated by depowering a voltage rail 94 powering that global ring bus(es) 36. A voltage of each of the voltage rails 94(0)-94(N) may be separately maintained by different voltage regulators 96(0)-96(N). The voltage regulators 96(0)-96(N) may or may not be coupled to a same reference voltage rail 98. In FIG. 12, the global request ring bus 80 and/or the global data ring bus 82(0) may be deactivated by depowering the voltage rail 94(0). The global data ring bus 82(N) may be deactivated by depowering the voltage rail 94(N). Alternatively, the global ring bus(es) 36 may be deactivated by stopping a clock signal 20 (not shown) clocking the global ring bus(es) 36.

The on-chip hybrid ring bus interconnects 22, 22(1), 22(2), and related devices, processor-based systems, and methods, according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 13:
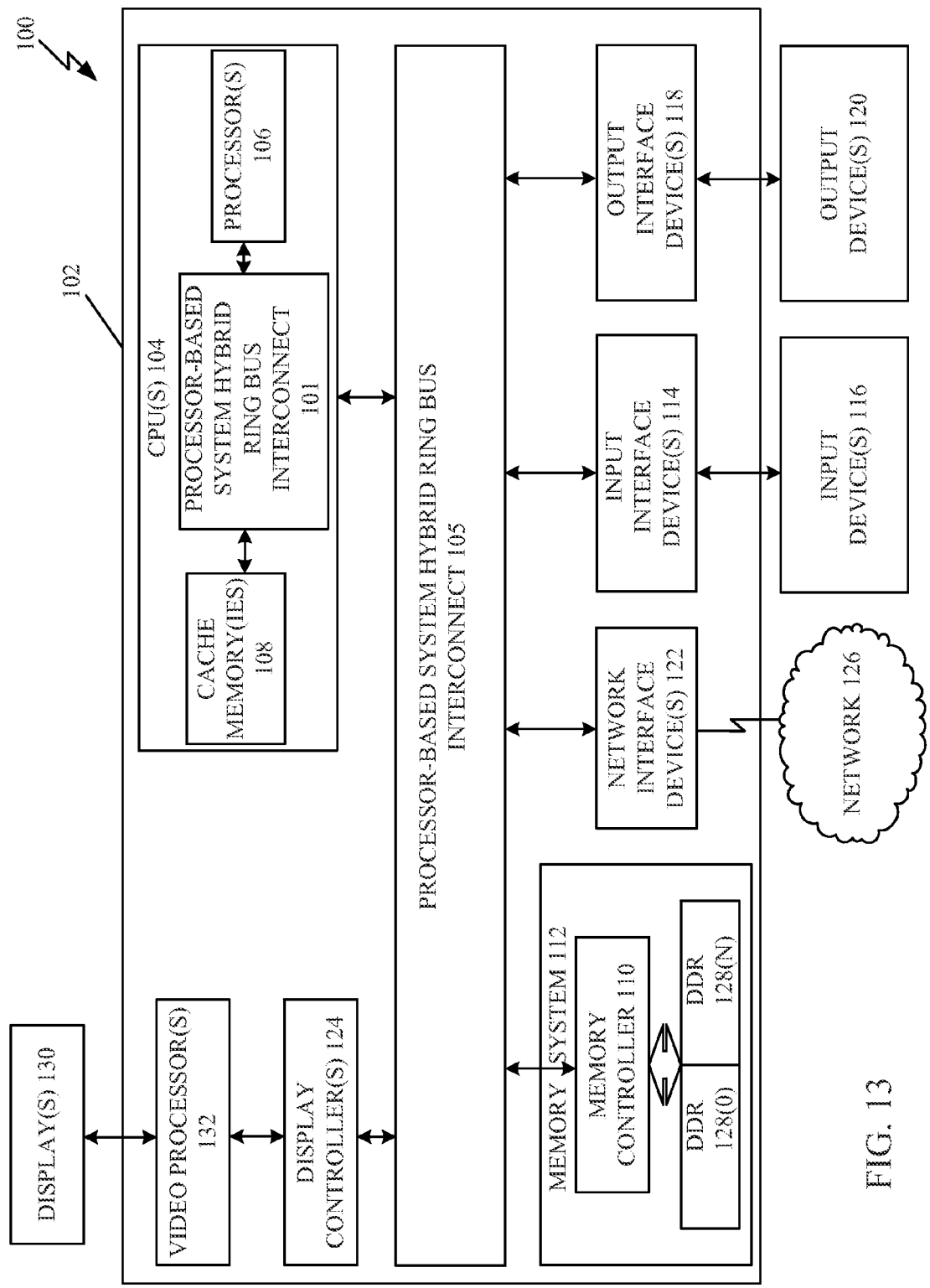
FIG. 13 is a block diagram of an exemplary processor-based system that can include processor-based system hybrid ring bus interconnects according to this disclosure, including but not limited to the processor-based system hybrid ring bus interconnects of FIGS. 2-12, having inter-ring routers configured to dynamically direct bus transaction messages among a plurality of ring buses of the processor-based system hybrid ring bus interconnect based on bandwidth requirements of a requester device(s).

In this regard, FIG. 13 illustrates an example of a processor-based system 100 that can employ a processor-based system hybrid ring bus interconnect 101 discussed herein, which may be on-chip hybrid ring bus interconnects 22, 22(1), or 22(2) illustrated in FIGS. 2-12. In this example, the processor-based system 100 comprises a system-on-a-chip (SOC) 102. The processor-based system 100 further includes one or more central processing units (CPUs) 104, each including one or more processors 106. As illustrated in FIG. 13, the one or more processors 106 may be coupled to an on-chip hybrid ring bus interconnect 22, 22(1), 22(2). As also illustrated in FIG. 13, the CPU(s) 104 may include cache memory(ies) 108 coupled to the on-chip hybrid ring bus interconnects 22, 22(1), 22(2) to allow the processor(s) 106 rapid access to temporarily stored data. The processor(s) 106 may be a bus transaction requester 26, 26' (e.g., a bus master device(s)). The cache memory(ies) 108 may be a bus transaction responder 30, 30' (e.g., a bus slave device(s)).

As illustrated in FIG. 13, the CPU(s) 104 may be coupled to another processor-based system hybrid ring bus interconnect 105, which may be on-chip hybrid ring bus interconnect 22', 22'(1), or 22'(2) which serves as a system bus. The processor-based system hybrid ring bus interconnect 105 intercouples bus master slave devices included in the processor-based system 100. The CPU(s) 104 communicates with these other devices by exchanging address, control, and data information over the processor-based system hybrid ring bus interconnect 105. For example, the CPU(s) 104 can communicate bus transaction requests to a memory controller 110 as an example of a slave device. As illustrated in FIG. 13, multiple processor-based system hybrid ring bus interconnects (e.g., 101, 105) may be provided in the SOC 102, wherein each processor-based system hybrid ring bus interconnect 101, 105 constitutes a different fabric. However, the processor-based system hybrid ring bus interconnects 101, 105 could also be provided as a single on-chip hybrid ring bus interconnect 101, 105 for the SOC 102.

Other master and slave devices may be connected to the processor-based system hybrid ring bus interconnect 105. As illustrated in FIG. 13, these devices can include a memory system 112, one or more input interface devices 114 for communicating with one or more input devices 116, one or more output interface devices 118 for communicating with one or more output devices 120, one or more network interface devices 122, and one or more display controllers 124, as examples. The input device(s) 116 can include any type of input device, including but not limited to input keys, switches, voice processors, etc. The output device(s) 120 can include any type of output device, including but not limited to audio, video, other visual indicators, etc. The network interface device(s) 122 can be any devices configured to allow exchange of data to and from a network 126. The network 126 can be any type of network, including but not limited to a wired or wireless network, a private or public network, a local area network (LAN), a wide local area network (WLAN), and the Internet. The network interface device(s) 122 can be configured to support any type of communication protocol desired. The memory system 112 can include one or more memory units 128(0)-128(N).

The CPU(s) 104 may also be configured to access the display controller(s) 124 over the processor-based system hybrid ring bus interconnect 105 to control information sent to one or more displays 130. The display controller(s) 124 sends information to the display(s) 130 to be displayed via one or more video processors 132, which process the information to be displayed into a format suitable for the display(s) 130. The display(s) 130 can include any type of display, including but not limited to a cathode ray tube (CRT), a liquid crystal display (LCD), a plasma display, a light-emitting display (LED), etc. The CPU(s) 104 and the display controller(s) 124 may act as master devices to make memory access requests over the processor-based system hybrid ring bus interconnect 105.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The processor-based system hybrid ring bus interconnects, master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a digital signal processor (DSP), an Application Specific Integrated Circuit (ASIC), a field-programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a compact disc read-only memory (CD-ROM), or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A hybrid ring bus interconnect for a processor-based system, comprising:
   a plurality of ring buses in a semiconductor die each of the plurality of ring buses having a bus width and configured to receive bus transaction messages from at least one requester device; and
   at least one inter-ring router in the semiconductor die coupled o the plurality of ring buses;
   the at least one inter-ring router configured to dynamically direct the bus transaction messages among the plurality of ring buses based on bandwidth performance requirements of the at least one requester device.

2. The hybrid ring bus interconnect of claim 1, wherein the plurality of ring buses comprises a plurality of local ring buses and a plurality of global ring buses;
   the at least one inter-ring router configured to dynamically direct the bus transaction messages from a local ring bus among the plurality of local ring buses to a global ring bus among the plurality of global ring buses based on the bandwidth performance requirements of the at least one requester device.

3. The hybrid ring bus interconnect of claim 2, wherein the at least one inter-ring router comprises a plurality of inter-ring routers, each of the plurality of inter-ring routers configured to dynamically direct the bus transaction messages from the local ring bus among the plurality of local ring buses to the global ring bus among the plurality of global ring buses based on the bandwidth performance requirements of the at least one requester device.

4. The hybrid ring bus interconnect of claim 1, further comprising at least one transmit ring bus and at least one receive ring bus in the plurality of ring buses.

5. The hybrid ring bus interconnect of claim 1, further comprising a resource manager configured to control the at least one inter-ring router to direct the bus transaction messages among the plurality of ring buses based on the bandwidth performance requirements of the at least one requester device.

6. The hybrid ring bus interconnect of claim 5, wherein the resource manager is further configured to frequency scale each of the plurality of ring buses independently.

7. The hybrid ring bus interconnect of claim 5, wherein the resource manager is further configured to activate and deactivate each of the plurality of ring buses independently.

8. The hybrid ring bus interconnect of claim 7, wherein the resource manager is further configured to deactivate at least one ring bus among the plurality of ring buses in response to receiving a lower power mode update.

9. The hybrid ring bus interconnect of claim 8, wherein the resource manager is further configured to reactivate the at least one ring bus in response to receiving a higher power mode update.

10. The hybrid ring bus interconnect of claim 5, wherein the resource manager is further configured to change the bus width of each of the plurality of ring buses.

11. The hybrid ring bus interconnect of claim 1, further comprising at least two different voltage rails wherein each of the plurality of ring buses is powered by one of the at least two different voltage rails.

12. The hybrid ring bus interconnect of claim 1 integrated into at least one semiconductor die.

13. The hybrid ring bus interconnect of claim 1, further comprising a device selected from the group consisting of: a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player, into which the hybrid ring bus interconnect is integrated.

14. The hybrid ring bus interconnect of claim 1, wherein the at least one inter-ring router comprises a plurality of inter-ring routers each configured to dynamically direct the bus transaction messages among the plurality of ring buses based on the bandwidth performance requirements of the at least one requester device.

15. A hybrid ring bus interconnect means, comprising:
    a means for receiving bus transaction messages from at least one requester device and routing the bus transaction messages in a ring of a plurality of rings in a semiconductor die, each of the plurality of rings having a bus width; and
    a means for dynamically directing the bus transaction messages among the plurality of rings based on bandwidth performance requirements of the at least one requester device.

16. A method of directing bus transaction messages in a hybrid ring interconnect, comprising:
    receiving bus transaction messages from at least one requester device;
    directing the bus transaction messages onto a ring bus among a plurality of ring buses in a semiconductor die, each of the plurality of ring buses having a bus width and configured to receive the bus transaction messages; and
    dynamically directing from at least one inter-ring router in the semiconductor die coupled to the ring bus, the bus transaction messages from the ring bus to another ring bus among the plurality of ring buses based on bandwidth performance requirements of the at least one requester device.

17. The method of claim 16, wherein the plurality of ring buses comprises a plurality of local ring buses and a plurality of global ring buses;
    wherein dynamically directing the bus transaction messages further comprises dynamically directing from the at least one inter-ring router, the bus transaction messages from a local ring bus among the plurality of local ring buses to a global ring bus among the plurality of global ring buses based on the bandwidth performance requirements of the at least one requester device.

18. The method of claim 17, wherein dynamically directing the bus transaction messages comprises dynamically directing, from a plurality of inter-ring routers, the bus transactions messages from the local ring bus among the plurality of local ring buses to the global ring bus among the plurality of global ring buses based on the bandwidth performance requirements of the at least one requester device.

19. The method of claim 16, further comprising deactivating at least one ring bus among the plurality of ring buses based on the bandwidth performance requirements.

20. The method of claim 19, further comprising reactivating the at least one ring bus based on the bandwidth performance requirements.

21. The method of claim 16, comprising dynamically directing, from the at least one inter-ring router in the semiconductor die coupled to the ring bus, the bus transaction messages from the ring bus to the another ring bus among the plurality of ring buses based on the bandwidth performance requirements of the at least one requester device.

22. A resource manager for controlling a hybrid ring bus interconnect, wherein the resource manager is configured to:
determine whether a plurality of bus transaction requesters are active;
determine bandwidth performance requirements of each active bus transaction requester;
calculate a topology of the hybrid ring bus interconnect in a semiconductor die based on the bandwidth performance requirements of the active bus transaction requesters; and
modify a configuration of at least one inter-ring router to dynamically route bus transaction messages among a plurality of ring buses in the semiconductor die based on the calculated topology.

23. The resource manager of claim 22, wherein the hybrid ring bus interconnect comprises:
the plurality of ring buses in the semiconductor die, each of the plurality of ring buses having a bus width and configured to receive the bus transaction messages from at least one requester device;
the at least one inter-ring router in the semiconductor die coupled to the plurality of ring buses; and
the resource manager configured to control the at least one inter-ring router to dynamically direct the bus transaction messages among the plurality of ring buses based on the bandwidth performance requirements of the at least one requester device.

24. The resource manager of claim 23, wherein to modify the configuration of the at least one inter-ring router, the resource manager is configured to:
determine at least one routing table for the at least one inter-ring router based on the calculated topology; and
transmit the at least one routing table to the at least one inter-ring router.

25. The resource manager of claim 24, further configured to transmit a handshake message to the at least one inter-ring router for reconfiguring the transmitted at least one routing table.

26. The resource manager of claim 24, wherein the at least one routing table comprises a direction to transmit the bus transaction messages based on at least one of: a destination of the bus transaction messages and a source of the bus transaction messages.

27. The resource manager of claim 24, wherein the at least one routing table further comprises a bus frequency data rate at which to transmit the bus transaction messages based on at least one of a destination of the bus transaction messages and a source of the bus transaction messages.

28. The resource manager of claim 24, wherein the at least one routing table comprises the bus width for transmitting the bus transaction messages based on at least one of: a destination of the bus transaction messages and a source of the bus transaction messages.

29. The resource manager of claim 23, further configured to deactivate at least one ring bus among the plurality of ring buses in response to receiving a lower power mode update.

30. The resource manager of claim 29 configured to deactivate the at least one ring bus by depowering a voltage rail powering the at least one ring bus.

31. The resource manager of claim 29 configured to deactivate the at least one ring bus by stopping a clock signal clocking the at least one ring bus.

32. The resource manager of claim 29, further configured to reactivate the at least one ring bus in response to receiving a higher power mode update.

33. The resource manager of claim 23, configured to modify the configuration by being configured to modify a plurality of inter-ring routers to route the bus transaction messages based on the calculated topology.

34. The resource manager of claim 23, wherein the plurality of ring buses comprises a plurality of local ring buses and a plurality of global ring buses;
the resource manager configured to control the at least one inter-ring router to dynamically direct the bus transaction messages from a local ring bus among the plurality of local ring buses to a global ring bus among the plurality of global ring buses based on the bandwidth performance requirements of the at least one requester device.

35. The resource manager of claim 22, configured to control a plurality of inter-ring routers to dynamically direct the bus transaction messages among the plurality of ring buses based on the bandwidth performance requirements of the at least one requester device.

36. A resource manager for controlling a hybrid ring bus interconnect, comprising:
a means for determining whether a plurality of bus transaction requesters are active;
a means for determining bandwidth performance requirements of each active bus transaction requester;
a means for calculating a topology of a hybrid ring bus interconnect in a semiconductor die based on the bandwidth performance requirements of each active bus transaction requester; and
a means for modifying a configuration of at least one inter-ring router to dynamically route bus transaction messages among a plurality of ring buses based on the calculated topology.

37. A computer-readable medium having stored thereon computer-executable instructions to cause a resource manager to direct bus transaction messages in a hybrid ring bus interconnect by causing the resource manager to:
receive bus transaction messages from at least one requester device;
direct the bus transaction messages onto a ring bus in a semiconductor die among a plurality of ring buses, each having a bus width and configured to receive the bus transaction messages from the at least one requester device;

dynamically direct the bus transaction messages among the plurality of ring buses through at least one inter-ring router in the semiconductor die coupled to the plurality of ring buses based on bandwidth performance requirements of the at least one requester device; and determine the bandwidth performance requirements of the at least one requester device.

38. The computer-readable medium of claim 37, further comprising the computer-executable instructions to cause the resource manager to deactivate at least one ring bus among the plurality of ring buses based on the bandwidth performance requirements.

39. The computer-readable medium of claim 38, further comprising the computer-executable instructions to cause the resource manager to reactivate the at least one ring bus based on the bandwidth performance requirements.

* * * * *